Figure 1:
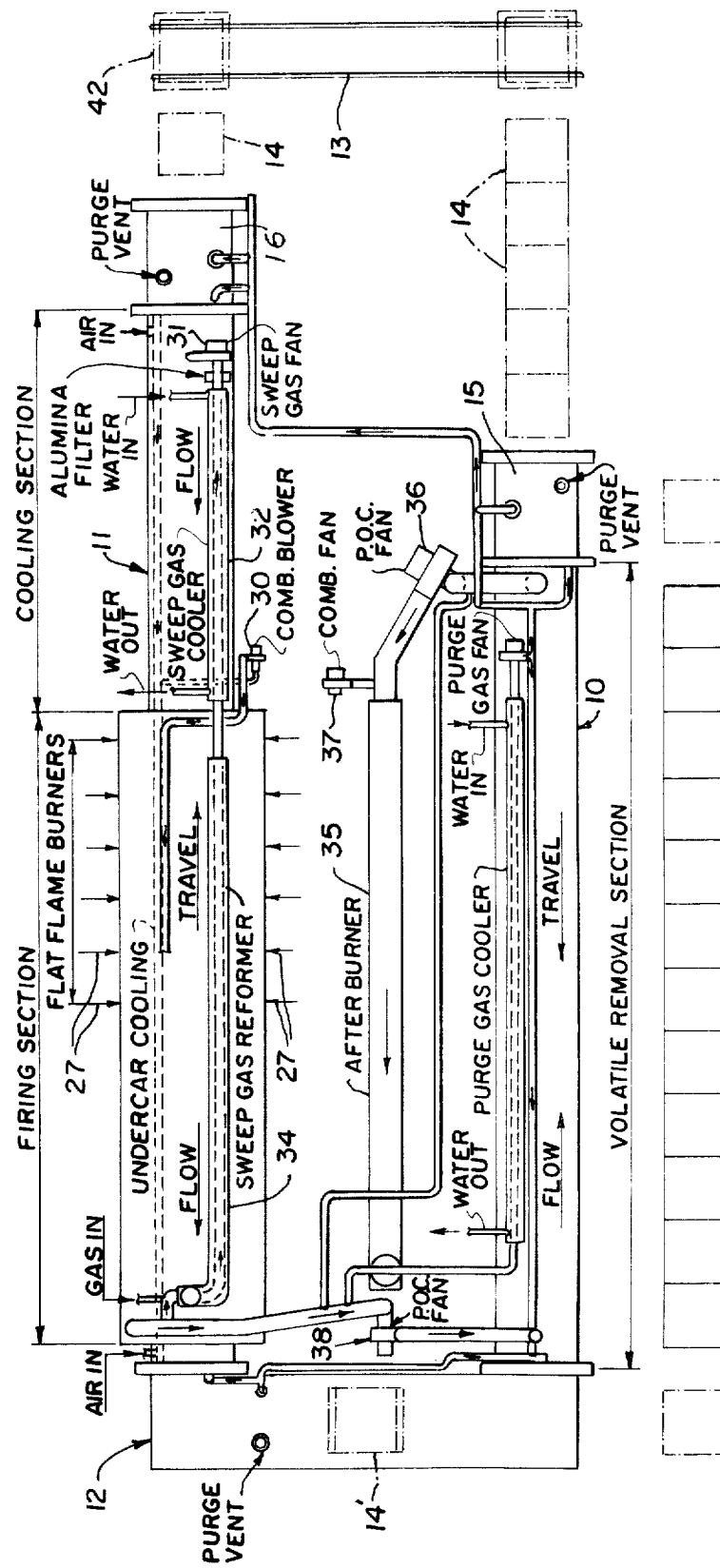

United States Patent
Osman et al.

[11] 3,887,437
[45] June 3, 1975

[54] TUNNEL KILN FIRING OF CARBON PRODUCTS

[75] Inventors: Mohammed A. Osman; Charles L. Kaib, both of Pittsburgh, Pa.

[73] Assignee: Pullman Incorporated, Pittsburgh, Pa.

[22] Filed: Sept. 20, 1972

[21] Appl. No.: 290,576

[52] U.S. Cl. .................... 202/117; 201/32; 201/44
[51] Int. Cl. ...... C10b 1/00; C10b 7/00; C10b 31/00
[58] Field of Search ............... 202/98, 97, 103, 117; 201/44, 32; 264/29

[56] References Cited
UNITED STATES PATENTS

| | | | |
|---|---|---|---|
| 1,462,576 | 7/1923 | Illingworth | 201/44 X |
| 2,208,705 | 7/1940 | Soubbotin et al. | 202/98 |
| 3,009,863 | 11/1961 | Angevine | 201/32 X |
| 3,464,892 | 9/1969 | Bennett | 202/98 |
| 3,644,193 | 2/1972 | Weggel et al. | 202/117 |

*Primary Examiner*—Norman Yudkoff
*Assistant Examiner*—D. Sanders
*Attorney, Agent, or Firm*—Buell, Blenko & Ziesenheim

[57] ABSTRACT

The specification discloses tunnel kiln apparatus for the firing of carbon products, which apparatus comprises two main sections, one a low-temperature volatiles removal section and the other a combined high-temperature firing and cooling section, the two sections being connected by a gastight vestibule via which carbon ware laden cars are transferred progressively from the one to the other section. The lighter oils are distilled out in the volatiles removal section by heat from a hot gas mixture comprising (1) products of combustion (POC) from the firing zone of the firing and cooling section in which the high-temperature baking operation takes place in a reducing atmosphere, (2) products of combustion of an afterburner to which a portion of the gas mixture discharged from the volatiles removing section is supplied, and (3) a portion of the gas mixture discharged from the volatiles removal section. The apparatus comprises (1) a sweep gas system wherein a supply of sweep gas enters the exit end of the cooling zone and is discharged at the entrance end of the firing zone, and (2) a purge gas system for pressurizing the transfer vestibule, an entrance vestibule for the volatiles removal section, an exit vestibule for the cooling zone and an under car chamber of the volatiles removal section.

12 Claims, 3 Drawing Figures

TUNNEL KILN FIRING OF CARBON PRODUCTS

Prior designs of furnaces, including furnaces of the tunnel kiln type, were arranged to provide high-temperature baking (about 2,300°F) that is, firing of green carbon ware in a reducing (deoxidizing) atmosphere. During the heating of a tar-bonded green carbon ware, the light tar oil vapors and by-products first distilled out, leaving behind the heavy constituents of the tar. At still higher temperatures, these heavy residues start to crack and, in consequence, hydrogen ($H_2$) with perhaps some carbon monoxide (CO) evolves leaving behind solid carbon residue.

The condensation of the light tar oil vapors at the relatively cooler parts of the kiln, and the tendency of these vapors to crack when part of it finds its way to the hotter part of the kiln, depositing carbon and reducing the firing efficiency of the unit, are common difficulties of the carbon baking industry and cause frequent kiln shut-down for cleanout of tars oils and carbon.

We propose to provide a new design and arrangement of tunnel kiln apparatus which will:

a. substantially decrease and/or eliminate most of the trouble areas of present day tunnel kilns that are shown to cause frequent kiln shut downs;
b. decrease the capital investment required and in consequence, the capital investment per ton of product; and
c. result in a significant and substantial decrease in operating and maintenance cost, thereby effecting a lower production cost for the carbon ware.

The new design and arrangement of tunnel kiln apparatus which we propose to provide comprises two separate sections, one a volatiles removal section and the other a combined high-temperature firing and cooling section, with a gas-tight vestibule connecting the two sections. Cars carrying the carbon ware are moved progressively through the volatiles removal section, the connecting vestibule, and the firing and cooling section. The products of combustion (POC) of the high-temperature firing section are supplied back to the volatiles removal section to provide the necessary heat for distillation of the light tar oils and the like. Burning of the carbon ware while in the firing section is prevented by maintaining a reducing atmosphere therein.

Figure 2:
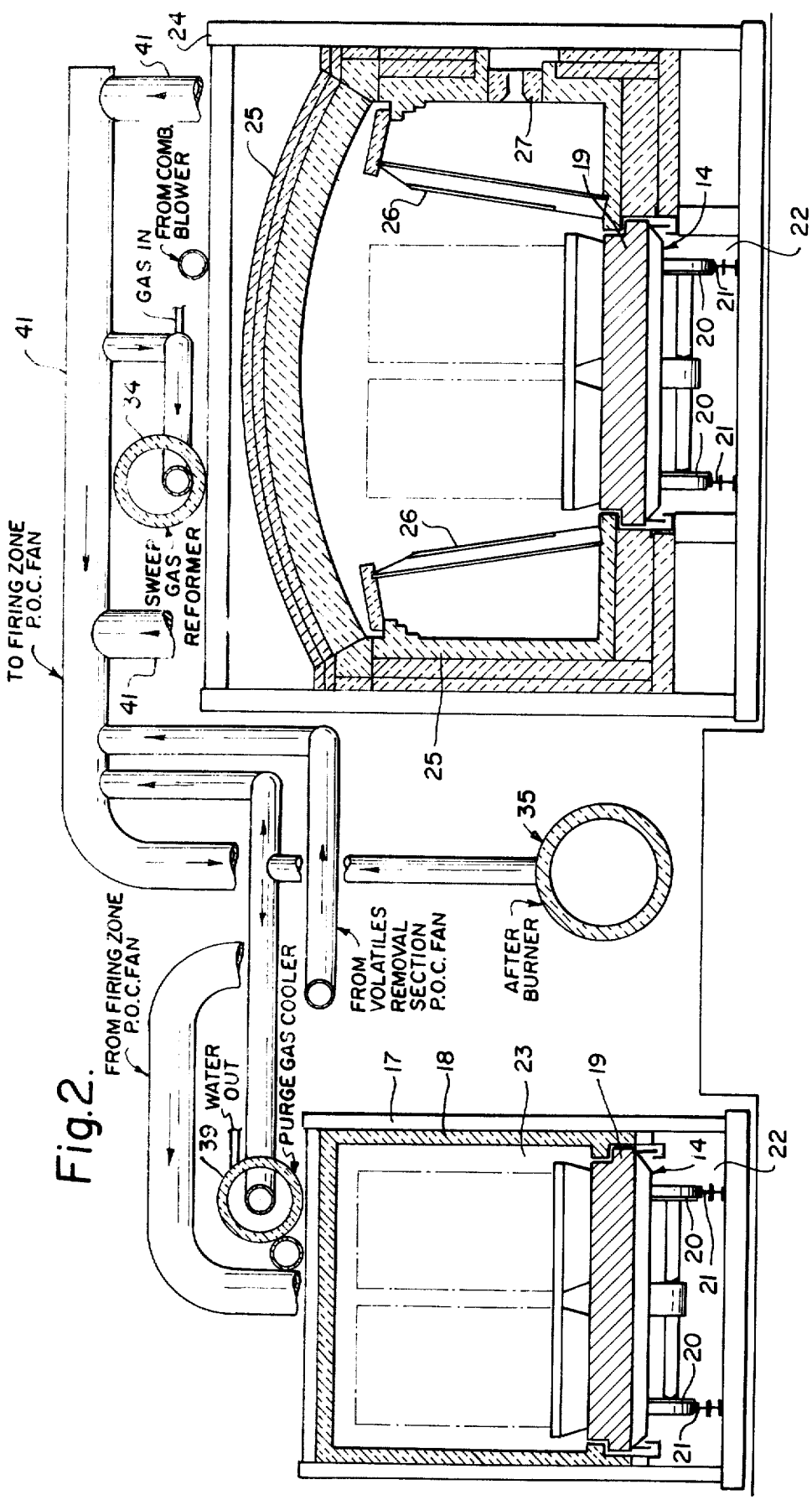
Figure 3:
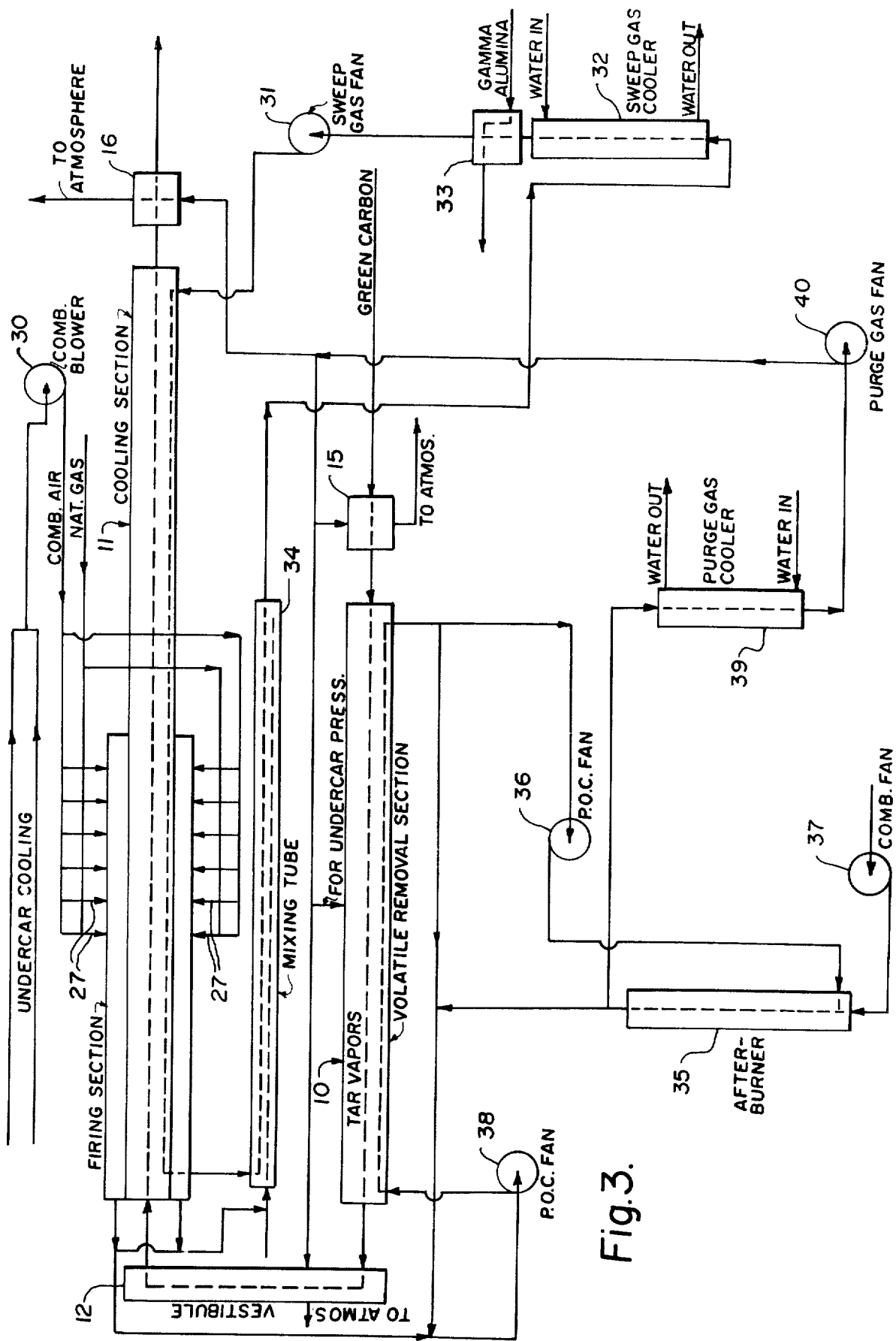

Other and more complete details of the new design and arrangement of tunnel kiln apparatus will be described hereinafter in connection with the accompanying drawings wherein:

FIG. 1 is a diagrammatic view, showing the general arrangement and design of tunnel kiln apparatus, FIG. 2 is a cross-sectional view on enlarged scale, showing the relative size and locations of the volatiles removal section and the firing and cooling section, and FIG. 3 is a diagram showing the path of carbon ware through the several sections of the tunnel kiln, and also the path of flow of products of cumbustion, purge gases, sweep gases, etc.

Referring to FIGS. 1 and 2 of the drawings, the tunnel kiln apparatus comprises a co-called volatiles removal section 10, hereinafter referred to as the V-R section, a parallel-extending firing and cooling section 11, and a gastight connecting vestibule 12 extending transversely between the exit for cars in the V-R section and the entrance end for cars in the firing and cooling section. At the end of the sections 10 and 11 opposite from the vestibule 12 is a transfer track 13 which is employed for supplying "green" carbon cars 14 to a vestibule 15 at the entrance end of the V-R section and for removing "fired" carbon cars 14 from the vestibule 16 at the exit end of the firing and cooling section 11.

The vestibules 15 and 16 are, in effect, gas-tight chambers at the entrance end of the V-R section and the exit end of the firing and cooling section 11, respectively. Each vestibule is provided with an exterior door and an interior door, operation of which is effected in sequence, in accordance with progressive step-by-step advancement of the cars through the tunnel kiln sections, as more fully described later on.

For purposes of illustration, the length of the V-R section 10 is such as to hold twelve cars, diagrammatically shown in block form adjacent the V-R section 10 in FIG. 1. The firing and cooling section 11 is shown as of a length to hold 10 cars in the firing zone and six cars in the cooling zone, such cars being shown in block form adjacent the firing and cooling section in FIG. 1.

As more particularly shown in FIG. 2, the V-R section 10 comprises a gas-tight steel shell 17 with suitable gas-tight expansion joints. The shell 17 is lined with suitable blanket and board type insulation 18 pinned to the shell. The cars 14 comprise platforms 19 and wheels 20 which travel on track rails 21 fixed in the foundation structure. The platforms of the cars 14 are suitably sealed to the walls of the section so as to provide a chamber 22 under the cars which is pressurized by the POC purge gas under constant positive pressure. Entry of the tar vapors and by-products into the area under the cars is thus prevented and cleanliness of the area maintained.

The cars could be designed to carry up to ten carbon blocks each of a size 52 × 31 × 20 inches in the chamber 23 formed above the platforms of the cars, as indicated by the broken lines.

The firing and cooling section 11 houses both the furnace and the cooling zones in one enclosure. This section comprises an outer gas-tight steel shell 24 with expansion joints. The lining 25 is constructed of insulating refractories. The furnace zone is of the indirectly fired type with suitable muffle fronts 26 in the firing chamber. Certain types of muffle fronts are recommended which enhance sweep gas circulation in the kiln. Because of the physical separation of the V-R section 10 from the furnace zone in the firing and cooling section 11, no appreciable carbon formation is expected on the muffle fronts 26. Moreover, with the relatively large volume of sweep gas used in this design and the consequent higher gas velocity, most of the solid particulates that might otherwise be formed in the kiln atmosphere will be "swept out" and thus reduce the possibility of solid (carbon) build up.

As will hereinafter be more fully described, the furnace zone is fired with any suitable burners, e.g., the flat flame type of burner system. When fired on a slightly less than stoichiometric air to fuel ratio, the burners have been found to provide a satisfactory product of combustion for the V-R section. As will be made more apparent hereinafter, the products of combustion are removed from the firing chambers at the car entrance end of the furnace zone.

An under car cooling system is designed into the steel shell of the firing and cooling section 11. The platforms 19 of the cars 14 are suitably sealed to the walls of the section to provide a cooling chamber 22 under the cars.

The connecting vestibule 12 encloses a transfer track extending between the exit end of the V-R section 10 and the entrance end of the firing and cooling section 11. It comprises an outer steel shell and an inner lining of blanket and board type insulation pinned to the steel shell, so as to reduce heat losses from the carbon ware load. This vestibule is pressurized by purge gas as more fully described hereafter. A transfer car 14' operates on the transfer tracks within the connecting vestibule to move the loaded cars from the V-R section 10 to the furnace zone of the firing and cooling section 11. A puller mechanism (not shown) brings the cars 14 from the V-R section while a pusher mechanism (not shown) advances the train and places the cars in the furnace zone.

Referring to FIGS. 1 and 3, a description of the following auxiliary equipment will now be given:
a. furnace zone combustion system
b. sweep gas system
c. V-R gas system
d. purge gas system The furnace zone combustion system comprises a selected number of suitable burners 27, illustratively shown as 12 in number, six on each side of the furnace zone. The entire number of burners preferably form a single control group, the group temperature being controlled by a thermocouple. The combustion air is preheated as it is supplied to the burners by a combustion blower 30 (FIGS. 1 and 3) from the under car cooling system of the firing and cooling section.

The sweep gas system comprises a sweep gas fan 31 (FIGS. 1 and 3) for circulating the sweep gas, a sweep gas cooler 32, a fluoride removal unit 33, and a POC/-natural gas mixer 34. The sweep gas is composed of carbon monoxide (CO), hydrogen ($H_2$), and nitrogen ($N_2$) with a possible small amount of natural gas ($CH_4$) and the like. It is supplied from the fan 31 to the exit end of the firing and cooling section, traveling longitudinally therethrough and leaving at the entrance end of the furnace zone of the firing and cooling section.

The sweep gas is then recycled via the POC/natural gas mixer 34, located adjacent the entrance end of the furnace zone, the sweep gas cooler 32, and the fluoride removal unit 33 to the fan 31.

The POC/natural gas mixer 34 comprises a suitable castable refractory duct with two connections, one to receive the premeasured products of combustion from the furnace zone off-take of POC and the second for natural gas. At start-up this arrangement may be utilized to produce the sweep gas required, thus eliminating the need for a stand-by unit. The sweep gas cooler 32 forms a part of the sweep gas piping or duct work. A section of the duct work is encased in a water jacket, through which water is circulated. Suitable means is provided for controlling the rate of flow of water through the jacket in accordance with the temperatures of the water and gas discharged from the jacketed duct. The discharge line from the jacket is connected to the plant water system, thereby allowing the water to be reused. The fluoride removal unit 33 comprises one or more alumina injection nozzles and a gas filter. The nozzles serve to introduce and mix fine gamma alumina powder into the gas stream. The filter serves to separate the alumina from the gas, together with any moisture that may be present therein. The filter should be changed and cleaned periodically, such as at intervals of 24 hours. The alumina collected may be returned to the pot line. It is estimated that about 50 pounds of alumina may be required in a 24-hour period.

Due to possible leakage in the joints of the firing chamber fronts, it is desirable to provide for a make-up of sweep gas based on the reaction of $H_2O$ and $CO_2$ in the products of combustion with natural gas. This may be done by mixing the make-up supply with the bulk of the sweep gas prior to the recycle back to the kiln. Based on theory and experience, such predetermined mixture is deemed not to harm the carbon ware.

The V-R gas system provides a blend of gases from different sources, namely a controlled amount of POC from an afterburner 35, recycled gases from the V-R section off-take (at 400°F) and the off-take from the firing zone POC (at 1,600°F). The blended gas (at 1200°F) should have the proper composition that will not burn the green carbon under the prevailing conditions in the V-R section 10. An off-take of POC from the V-R section at the car entrance end thereof is supplied by a POC fan 36 to the afterburner 35. Also, a supply of air, oxygen ($O_2$) and nitrogen ($N_2$) is supplied by a combustion fan 37 to the afterburner 35. The blend of gases is supplied by a firing zone POC fan 38 to the exit end of the V-R section.

The purge gas system receives its supply of gas from the outlet for the products of combustion of the afterburner 35. From the afterburner outlet, the purge gas passes through a cooler 39 (FIG. 3) and is then delivered by a purge gas fan 40 to the entrance end vestibule 15, the connecting vestibule 12, the exit vestibule 16, and the undercar area 22 of the V-R section 10. The system remains constantly operative to produce a continuous purge. A bleed to atmosphere from each of the vestibules is provided, as shown in the drawings.

In operation, the loading of the green carbon laden cars 14 into the kiln is initiated by opening the exterior door of the vestibule 15 while keeping the interior door closed and then moving a car 14 into the vestibule. After the car is fully within the vestibule, the exterior door is closed. As previously described this vestibule is continuously purged with POC gas from the afterburner. When a test indicates no oxygen in the vestibule, the interior door is opened. The purge gas then flows into the V-R section 10 because of the positive pressure maintained. This prevents the V-R section gas from entering the vestibule. While the interior door is open, the car 14 is advanced on tracks 21 into the V-R section 10 by suitable pusher means located in the vestibule. As soon as the car 14 is properly placed in the V-R section, the interior door to vestibule 15 is closed. The cars 14 are successively loaded into vestibule 15, in the manner described, until there are a sufficient number of cars, illustrated as twelve in number, to fill the length of the V-R section. Thereafter, when the entrance end interior door is opened, the exit door to the V-R section is also opened. Accordingly as the car 14 is pushed from vestibule 15 into the V-R section, the entire train or series of cars in the V-R section is moved one car length, with the result that the leading car is pushed out of the exit end of the V-R section onto the "transfer" car 14' in the connecting vestibule 12. When a product laden car 14 is properly in position on the transfer car 14' the doors of the V-R section are closed.

It will be understood that the thermal requirement for removal of volatiles from the green carbon on the cars 14 within the V-R section 10 is supplied by the products of combustion (POC) from the furnace zone of the firing and cooling section 11 and from the afterburner 35. As will be evident from FIG. 3, the POC gases are supplied via POC fan 38 to the exit end of the V-R section, and travel in countercurrent flow to travel of the cars 14 to the entrance end, from whence they are withdrawn and recycled as previously described.

The products of combustion gases enter the V-R section at about 1,200°F. The tar vapors and by-products volatilize and are carried with the gases that leave the V-R section at about 400°F. Due to the mixture of a large volume of POC gases with the volatile tar vapors and byproducts at a temperature exceeding 400°F (the evaporation temperature of most light tar oils), there is little or no condensation of the tar vapors as the system will be above the dew point of such vapors.

The temperature of the carbon in the V-R section will be raised to about 1,000°F with the time allowed for temperature soak out. Tests have established that heating green carbon in open fire atmosphere (with burners operating at slightly less than stoichiometric air to fuel ratio) will not harm or burn the carbon. Also tests have demonstrated that such products of combustion are "neutral" to the carbon up to 1,000°F. In the assumed operation, the products of combustion contain some hydrogen ($H_2$) and carbon-monoxide (CO) to "neutralize" the effect of carbon dioxide ($CO_2$) and water vapor ($H_2O$) on carbon up to or slightly below that level. Nevertheless, the tar oil vapors and by-products leaving the carbon body, would create an "envelope" that raises the safe operating temperature another few hundred degrees, for example to 1,100°F. It has been found that if green carbon is heated to 1,000°F and allowed sufficient soaking, 95% or more of the volatile constituents of the tar binder will be "cooked" out.

Returning to the sequence of movement of cars through the kiln, when a laden car is placed on the transfer car within the connecting vestibule 12, a puller mechanism moves the car from the V-R section to the furance zone entrance, while a pusher mechanism moves the car into the furnace zone and at the same time advances cars, preceding the instant car, already in the furnace zone. It will be understood that when the transfer car 14' moves a laden car into position at the entrance end of the furnace zone, the entrance door at that end of the furnace zone is opened to enable the pusher mechanism to advance the laden car into the furnace zone.

As previously indicated, the sweep gas is circulated from the exit end of the firing and cooling section 11 lengthwise therethrough and is removed through the arch at the entrance end of the furnace zone. The purge gas pressure in vestibule 16 prevents the hot sweep gases from entering the vestibule when the interior door of the vestibule 16 is opened. The products of combustion in the furnace zone of the firing and cooling section 11 are removed at the car entrance end of the furnace zone via suitable ducts 41 (FIG. 2) leading to the POC fan 38.

The carbon ware on the laden cars 14 enters the furnace zone at about 900°F. The time required to progressively advance the cars in step-by-step fashion through the firing zone will raise the temperature of the carbon ware to about 2,300°F and allow the carbon ware to soak at this temperature before leaving the firing zone.

The cooling zone of the firing and cooling section 11 is open directly to the firing zone at one end. At the opposite or "cold" end is a door leading to the exit end vestibule 16, previously referred to as the interior door of the vestibule, which is opened whenever the furnace zone entrance door opens. When the pusher mechanism moves a car from the connecting vestibule 12 into the firing zone, the cars within the firing and cooling section are corrspondingly advanced one car length. When the entire length of the firing and cooling section is filled with cars, the opening of the door at the exit end of the cooling zone allows a car to be advanced into the exit end vestibule 16. A suitable puller mechanism located in the exit end vestibule will position the car fully within the vestibule to insure that the exit end door may be closed. The exit end door is then closed.

As previously indicated, the carbon ware on the cars is at about 2,300°F temperature on leaving the firing zone. Thus the temperature of the carbon ware on entry into the cooling zone is correspondingly about 2,300°F. At the time the cars leave the cooling section, the carbon ware reduces to a temperature in the range of 400°–500°F.

After a car enters the exit end vestibule 16 and the interior door is closed, the exterior door of the vestibule is opened. A suitable pusher mechanism is provided which advances the car 14 out of the vestibule into position on a transfer car 42. After removal of the fired carbon ware from car 14, the transfer car moves the car into proper position for re-loading and then for re-entry into the entrance end vestibule 15.

While a specific arrangement of tunnel kiln apparatus and a mode of operation thereof has been described herein, it will be apparent that variations therein are possible within the terms of the appended claims.

I claim:

1. Tunnel kiln apparatus especially for firing carbon products, said apparatus comprising a volatiles removal section through which cars laden with "green" carbon ware are moved progressively from an entrance end to an exit end, and a section physically separated from said volatiles removal section and having a firing zone and a cooling zone through which cars transferred from the exit end of the volatiles removal section are successively and progressively moved from an entrance end of said firing zone to an exit end of said cooling zone.

2. Tunnel kiln apparatus according to claim 1, wherein an isolatable vestibule intervenes between the exit end of the volatiles removal section and the entrance end of said firing zone and via which ware laden cars are transferred from the volatiles removal section to the said firing zone.

3. Tunnel kiln apparatus according to claim 1, wherein means are provided for withdrawing the hot products of combustion from said firing zone and supplying them to said volatiles removal section for effecting distillation of light tar oils from the carbon ware therein.

4. Tunnel kiln apparatus according to claim 1, wherein a sweep gas circulatory system is provided for supplying sweep gas to said cooling zone at a point adjacent the exit end thereof, causing the sweep gas to transverse the cooling zone and firing zone in succession to the entrance end of the firing zone, and for withdrawing the sweep gas at a point adjacent the entrance end of the firing zone.

5. Tunnel kiln apparatus according to claim 1, wherein an isolatable transfer vestibule is provided between the exit end of the volatiles removal section and the entrance to said firing zone via which laden cars are transferred from the volatiles removal section to the said firing zone, wherein said volatiles removal section comprises an isolatable vestibule adjacent the entrance end thereof, and wherein said cooling zone comprises an isolatable vestibule adjacent the exit end thereof.

6. Tunnel kiln apparatus according to claim 1, wherein afterburner means is provided to which a portion of the gas mixture withdrawn from the volatiles removal section is supplied, and wherein means is provided for supplying at least a portion of the products of combustion of the said afterburner means to mix with the products of combustion from said firing zone supplied to the volatiles removal section.

7. Tunnel kiln apparatus according to claim 1, wherein afterburner means is provided to which a portion of the gas mixture withdrawn from the volatiles removal section is supplied, means is provided for supplying at least a portion of the products of combustion of said afterburner means to mix with the products of combustion from the said firing zone supplied to the volatiles removal section, and means is provided for supplying a portion of the gas mixture withdrawn from the volatiles removal section to mix with the products of combustion from the firing zone and from the afterburner means as supplied to the volatiles removal section.

8. Tunnel kiln apparatus according to claim 4, wherein said sweep gas circulatory system comprises a mixer downstream of the firing zone for reformation of the sweep gas before recycling.

9. Tunnel kiln apparatus according to claim 4, wherein said sweep gas system comprises a circulatory fan upstream of the exit end of the said cooling section, and filtering and cooling means upstream of said circulatory fan.

10. Tunnel kiln apparatus according to claim 5, wherein a purge gas system is provided for supplying a purge gas under pressure continuously to said transfer vestibule, said volatiles removal section vestibule, and said cooling zone vestibule, and wherein means are provided for bleeding purge gas from said vestibules to atmosphere.

11. Tunnel kiln apparatus according to claim 6, wherein a sweep gas circulatory system is provided for supplying sweep gas to said cooling zone at a point adjacent the exit end thereof, causing the sweep gas to traverse the cooling zone and the firing zone in succession to the entrance end of the firing zone, and for withdrawing the sweep gas at a point adjacent the entrance end of the firing zone.

12. Tunnel kiln apparatus according to claim 10, wherein means is provided for supplying the products of combustion of the firing zone to said volatiles removal section at a point adjacent the exit thereof, means is provided for withdrawing the gas mixture established in the volatile removal section therefrom at a point adjacent the entrance end thereof, afterburner means is provided to which a portion of the gas mixture withdrawn from the volatiles removal section is supplied, and means is provided for diverting a portion of the products of combustion of the afterburner means to serve as the source of purge gas for said purge gas system.

* * * * *